(12) United States Patent
Miller

(10) Patent No.: US 8,416,193 B2
(45) Date of Patent: Apr. 9, 2013

(54) METHOD OF VISUALIZING AN INPUT LOCATION

(75) Inventor: Michael Curt Miller, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 495 days.

(21) Appl. No.: 12/469,847

(22) Filed: May 21, 2009

(65) Prior Publication Data

US 2010/0295788 A1    Nov. 25, 2010

(51) Int. Cl.
*G09G 5/08* (2006.01)

(52) U.S. Cl. ......... 345/168; 345/156; 715/765; 715/773

(58) Field of Classification Search .......... 345/156–168; 715/261, 773, 765
See application file for complete search history.

(56) References Cited

U.S. PATENT DOCUMENTS

| | | | |
|---|---|---|---|
| 5,594,778 A * | 1/1997 | Schaupp et al. | 455/418 |
| 6,211,856 B1 | 4/2001 | Choi et al. | |
| 6,466,203 B2 | 10/2002 | Van Ee | |
| 6,614,422 B1 | 9/2003 | Rafii et al. | |
| 6,948,136 B2 * | 9/2005 | Trewin | 715/865 |
| 2002/0118223 A1 * | 8/2002 | Steichen et al. | 345/745 |
| 2004/0159779 A1 | 8/2004 | Duff | |
| 2006/0053387 A1 * | 3/2006 | Ording | 715/773 |
| 2006/0161846 A1 * | 7/2006 | Van Leeuwen | 715/702 |
| 2008/0141125 A1 * | 6/2008 | Ghassabian | 715/261 |
| 2009/0051661 A1 | 2/2009 | Kraft et al. | |
| 2009/0160761 A1 * | 6/2009 | Moosavi et al. | 345/156 |
| 2010/0073404 A1 * | 3/2010 | Brown et al. | 345/634 |
| 2010/0180235 A1 * | 7/2010 | Griffin et al. | 715/841 |
| 2010/0251161 A1 * | 9/2010 | Fong et al. | 715/773 |
| 2011/0201387 A1 * | 8/2011 | Paek et al. | 455/566 |
| 2011/0214053 A1 * | 9/2011 | Scott et al. | 715/259 |

FOREIGN PATENT DOCUMENTS

| | | |
|---|---|---|
| JP | 10269022 A | 10/1998 |
| WO | 9429788 A1 | 12/1994 |
| WO | 0075766 A1 | 12/2000 |

OTHER PUBLICATIONS

AskTog, The iPhone User Experience: A First Touch (9-page web brochure), http://www.asktog.com/columns/072iPhoneFirstTouch.html (Jul. 2007).

(Continued)

*Primary Examiner* — Amare Mengistu
*Assistant Examiner* — Premal Patel
(74) *Attorney, Agent, or Firm* — Wolfe-SBMC

(57) ABSTRACT

One or more sensors to determine a location of an input. The data related to the location of the input, such as a character, may be displayed on an application on a display device. In addition, data that is related to the proximate areas of the location of the input may also be displayed, such as surrounding characters. If the user desires to enter the character into the application, the displayed character may be selected. If the user does not wish to select the character, the user may move the input to a new location and data related to the new location may be displayed on the application on the display device and the data related to the new location may be selected and entered in the application.

20 Claims, 5 Drawing Sheets

OTHER PUBLICATIONS

Android G2 Hands On: Close to Perfection, http://www.twine.com/item/120t8jh1v-88d/android-g2-hands-on-close-to-perfection, shared by Kris Rockwell on Feb. 17, 2009.

Roeber, Helena, et al.. Typing in Thin Air: The Canesta Projection Keyboard—a New Method of Interaction with Electronic Devices, http://www.cs.duke.edu/~tomasi/papers/roeber/roeberChi03.pdf. CHI 2003. Florida: New Horizons, Apr. 5-10, 2003.

Floating Keyboard for CAVE Environment, Texas Advanced Computing Center (5-page brochure), http://www.tacc.utexas.edu/~makoto/projects/cavoard.html, updated Mar. 11, 2006.

"International Search Report", Mailed Date: Dec. 24, 2010, Application No. PCT/US2010/034805, Filed Date: May 13, 2010, pp. 9.

* cited by examiner

METHOD OF VISUALIZING AN INPUT LOCATION

BACKGROUND

This Background is intended to provide the basic context of this patent application and it is not intended to describe a specific problem to be solved.

Entering data into a computing device seem simple enough. Keyboards or other input devices are often in communication with the computing devices and the input devices are design in a manner to make entering data as easy as possible. However, even as keyboard and other input devices such as touch screens have improved, entering data still requires many people to look at a keyboard or input device to accurately select the proper keys or input area rather than simply watching the inputted data appear of a display.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method of visualizing an input location is disclosed. The method may use one or more sensors to determine a location of an input. In some embodiments, location sensors are used on or near a keyboard. In another embodiment, the keyboard itself provide the location of the input. In yet another embodiment, a virtual keyboard is used. The data related to the location of the input, such as a character, may be displayed on an application on a display device. In addition, data that is related to the proximate areas of the location of the input may also be displayed, such as surrounding characters. If the user desires to enter the character into the application, the displayed character may be selected. If the user does not wish to select the character, the user may move the input to a new location and data related to the new location may be displayed on the application on the display device and the data related to the new location may be selected and entered in the application.

SPECIFICATION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
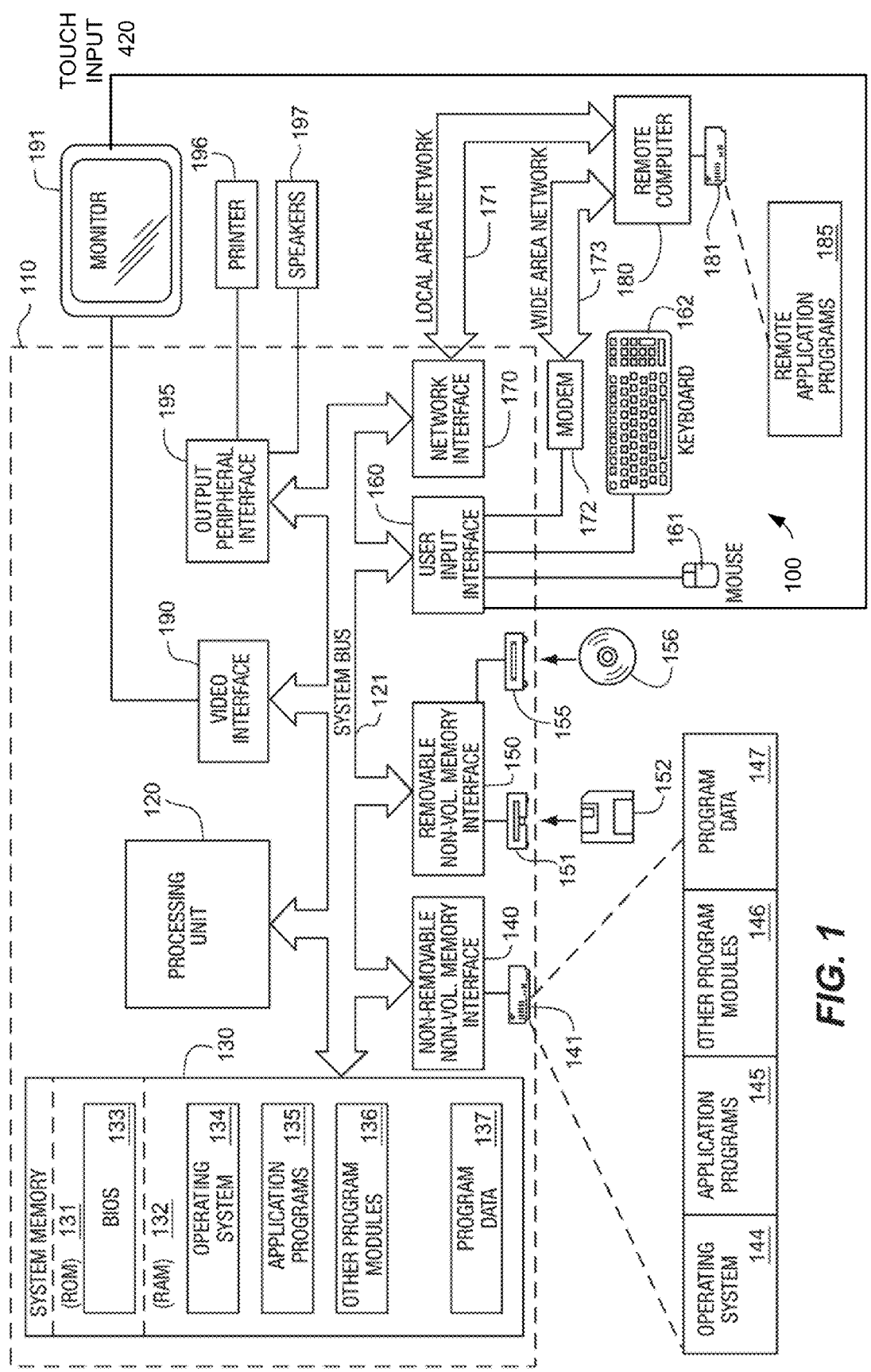
FIG. 1 is an illustration of a portable computing device.

FIG. 1 illustrates an example of a suitable computing system environment 100 that may operate to execute the many embodiments of a method and system described by this specification. It should be noted that the computing system environment 100 is only one example of a suitable computing environment and is not intended to suggest any limitation as to the scope of use or functionality of the method and apparatus of the claims. Neither should the computing environment 100 be interpreted as having any dependency or requirement relating to any one component or combination of components illustrated in the exemplary operating environment 100.

With reference to FIG. 1, an exemplary system for implementing the blocks of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120.

The computer 110 may operate in a networked environment using logical connections to one or more remote computers, such as a remote computer 180, via a local area network (LAN) 171 and/or a wide area network (WAN) 173 via a modem 172 or other network interface 170.

Computer 110 typically includes a variety of computer readable media that may be any available media that may be accessed by computer 110 and includes both volatile and nonvolatile media, removable and non-removable media. The system memory 130 includes computer storage media in the form of volatile and/or nonvolatile memory such as read only memory (ROM) 131 and random access memory (RAM) 132. The ROM may include a basic input/output system 133 (BIOS). RAM 132 typically contains data and/or program modules that include operating system 134, application programs 135, other program modules 136, and program data 137. The computer 110 may also include other removable/non-removable, volatile/nonvolatile computer storage media such as a hard disk drive 141 a magnetic disk drive 151 that reads from or writes to a magnetic disk 152, and an optical disk drive 155 that reads from or writes to an optical disk 156. The hard disk drive 141, 151, and 155 may interface with system bus 121 via interfaces 140, 150.

A user may enter commands and information into the computer 110 through input devices such as a traditional or virtual keyboard 162, a touch input sensor 420 on or in communication with the monitor 191 and pointing device 161, commonly referred to as a mouse, trackball or touch pad. Other input devices (not illustrated) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device may also be connected to the system bus 121 via an interface, such as a video interface 190. In addition to the monitor, computers may also include other peripheral output devices such as speakers 197 and printer 196, which may be connected through an output peripheral interface 190.

Figure 2:
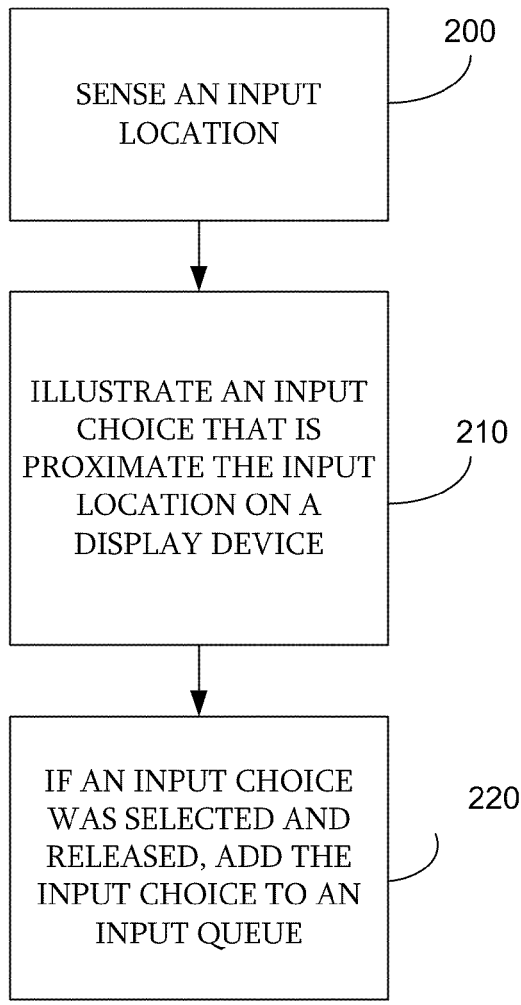
FIG. 2 is an illustration of a method of assisting entering keystrokes to an electronic computing device.

FIG. 2 is an illustration of a method of assisting entering keystrokes to an electronic computing device 191. At block 200, an input location 400 (FIG. 4) may be sensed. The input location 400 may be the location which the input 410, such as a finger, a stylus or other input device, is over or in close proximity. The sensing may occur in any logical and appropriate manner. In some embodiments, a keyboard 162 may have one of more sensor 420 which can use a variety of technologies to sense location, from using heat, to sensing capacitance to using radio waves to analyzing a video stream from the sensor 420.

The sensor 420 may be under or part of a keyboard or input device such as on a touch screen type device or the sensor 420 may be separate from the keyboard or input device. In some embodiments such as when a virtual keyboard is used, there is no keyboard 162 but only the sensor 420 that tracks the movement of the input 410 on a surface. In another virtual keyboard 420 embodiment, the sensor 420 may project a keyboard 420 onto a surface to assist a user. The sensor 420 may communicate the data to a processor 120 in the computing device 110. The processor may take the x and y location and determine an input location 400 which the input 410 is near. In some embodiments, the z location is taken and tracked also.

In some cases, the input location 400 may be underneath the input 410. In another embodiment, the direction of the input 410 may be tracked and the potential point of contact of the input 410 may be the input location 400. As the location of the sensors 420 may be known, the x and y location of the input 410 may be determined in relation to the sensors 420. As the layout of the various input locations 400 may be known in relation to the sensors 420 in an x and y type arrangement, the method may place the input 410 in the x-y plane and display it in an application on the display device 191 as a potential input choice that may be selected. Each input location 400, such as a key on a traditional keyboard, may be related to an input choice 450, such as a letter or a number.

In another embodiment, the sensors 420 may be part of or in communication with the keys themselves. In the case of a physical keyboard, when a key is touched, the key may indicate the input location 400. If the key is pressed and released, the input choice 450 may be added to an input queue 455. If the key is not the desired input choice 450, a user may touch over to another key as that key may be displayed as the input choice 450.

On a virtual keyboard 162 or a touch screen 420, when a key is pressed down, the key may indicate the input location 400. The input location 400 may be translated into the related input choice 450 and may only be added to the input queue 455 on the electronic computing device 110 if the key is released. In this way, a user can press a key and see it on the display 191 as an input choice 450 and if it is the desired key. If the pressed key is the desired key, the user may release the key and the input choice 450 may be added to the input queue 455. If the key is not the desired input choice 450, a user may slide over to another key as that key may be displayed as the input choice 450. The user may keep the input 410 (finger or pointer) on the display 191, move to the desired input choice 400 and then release the input 410 to selected the related input choice 450. The user may be able to slide across a touch screen display 191, seeing the letters appear as input choices 450 as the input 410 moves over them.

Figure 3A:
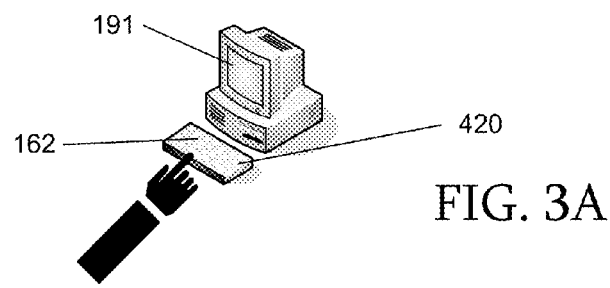
FIG. 3a is an illustration of a computing device with an input device and an electronic display.
Figure 3B:
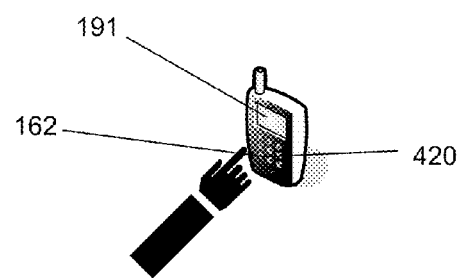
FIG. 3b is an illustration of a different computing device with an input device and an electronic display.
Figure 3C:
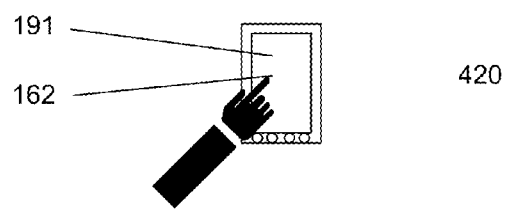
FIG. 3c is an illustration of a different computing device with an input device and an electronic display.
Figure 3D:
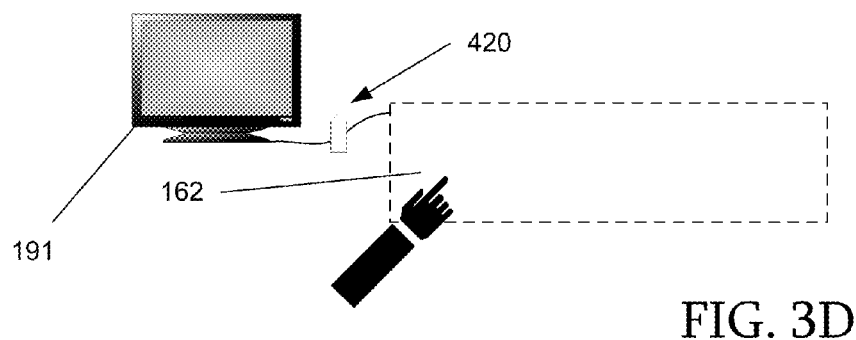
FIG. 3d is an illustration of a different computing device with an input device and an electronic display.

FIG. 3a illustrates a traditional type keyboard being the input device 162. FIG. 3b illustrates that a touch screen or a keypad on a portable computing device 110 such as a cellular telephone, pda, etc., may be input device 162. FIG. 3c illustrates a pure touch screen portable computing device 110 with a large input device 162 that also is the display 191. FIG. 3d illustrates that the input device 162 may be a virtual input device 162 with a device or sensor 420 that tracks the location of inputs. Of course, other input device 162 with other sensors 420 is possible and is contemplated.

In some embodiments such as when the sensor 420 is part of or in communication with the key on a keyboard 162, non directional input choices 450 may have an increased a repeat time. The repeat time may be an elapsed time required to start a repeat function for an input choice 450 that is selected. In this way, when the input choice 450 is selected it will not repeat unless it is released (except for directional keys such as arrows, page up, page down). The repeat time may be adjusted by a user, may be set remotely or may be adjusted in an adaptive manner by watching how a user edits the results of the input 400.

On the display 191, a visible carrot or other selection indication 430 may be displayed at an application input location 440 that is displayed on the display device 191. In some embodiments, the selection indication 430 may be a highlighting. In other embodiments, the selection indication 430 may be a flashing or colored rectangle. Of course, other selection indications 430 are possible and are contemplated. The selection indication 430 and the application input location 440 may be adjusted by moving an input device such as a mouse 161, by using directional inputs or any other appropriate methodology. In some embodiments, selection indication 430 and the application input location 440 may begin centered on the display 191 or may be displayed at the last application input location 440.

Figure 5:
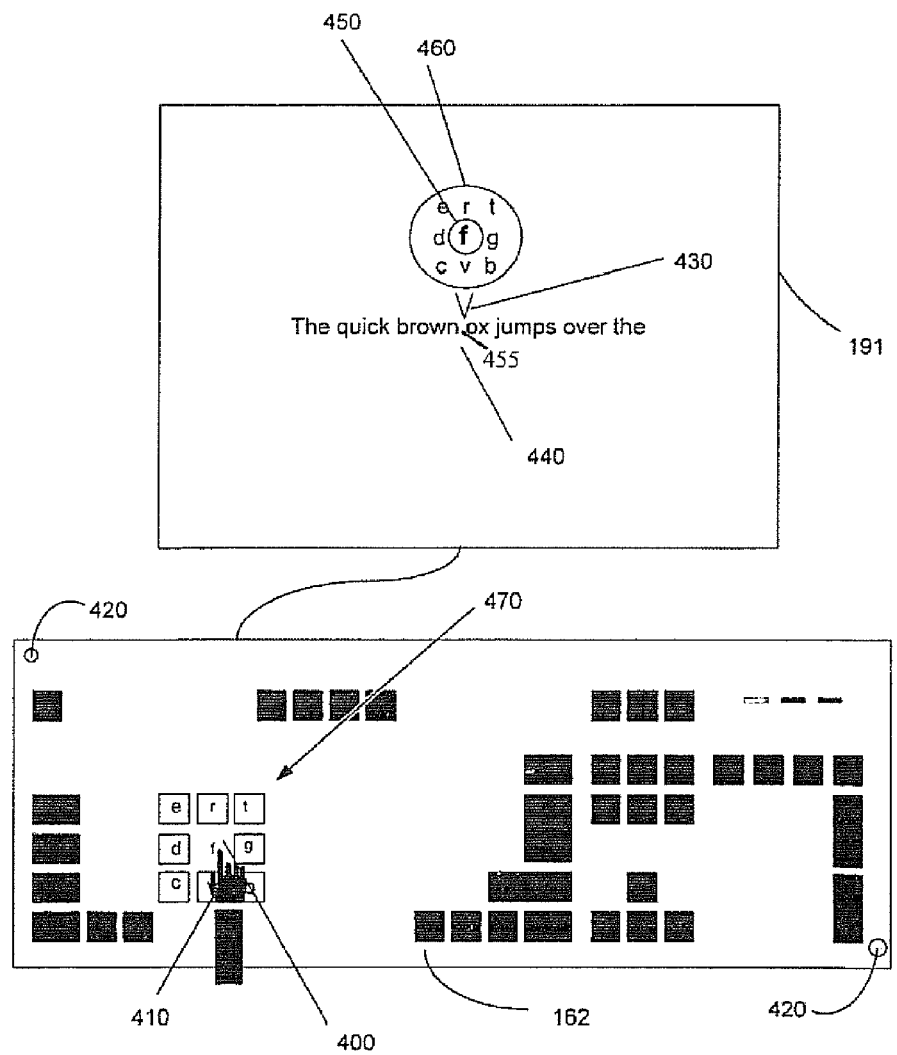
FIG. 5 is an illustration of an input choice with proximal input choices being displayed at an input location in an application on an electronic display device and an input device.

Referring again to FIG. 2, at block 210, one or more input choices 450 may be illustrated that is proximal the input location 400 on a display device 191 in communication with the electronic computing device 110. For example, on a traditional keyboard, the letter f is surrounded by the letters "e, d, c, v, b, g, t and r". These letter may be considered proximal to "f" and they may be displayed around "f". FIG. 5 is an illustration of an embodiment that displays multiple input choices 450.

Figure 4:
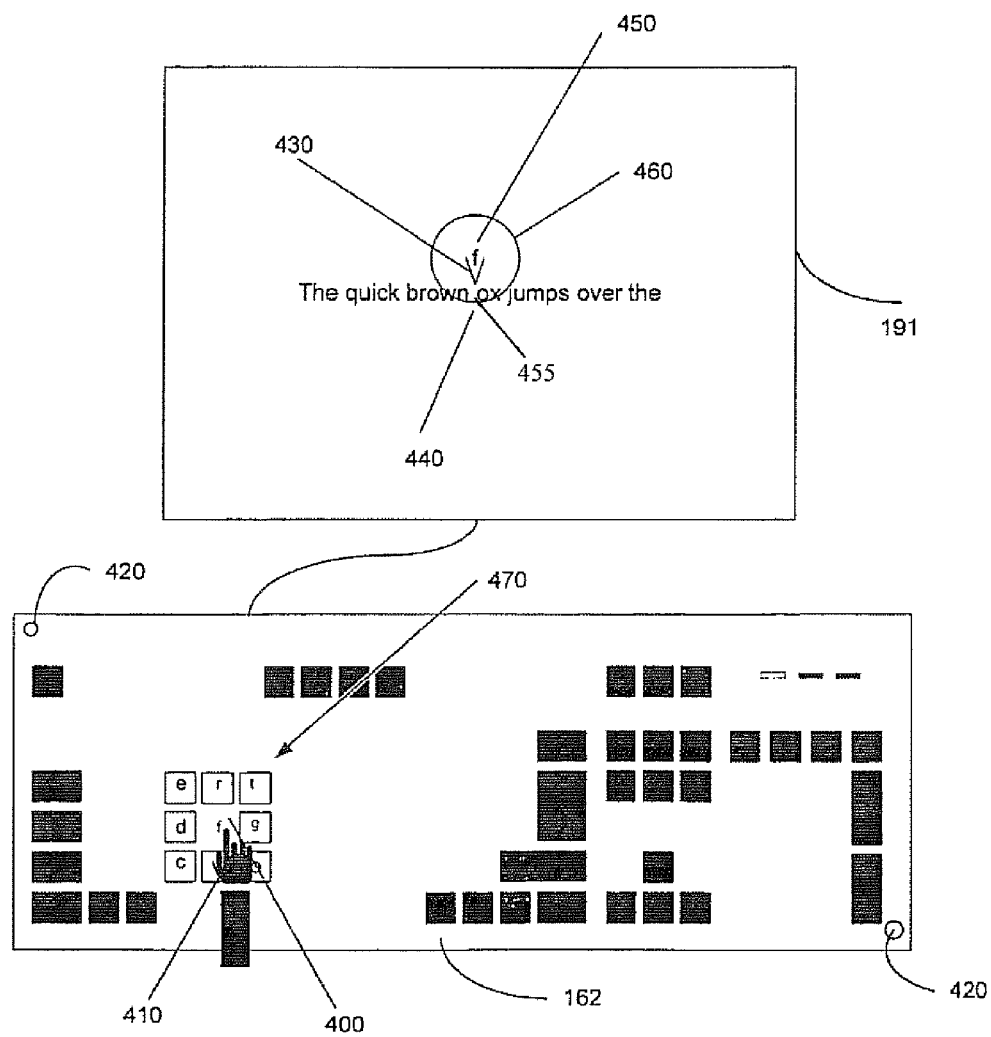
FIG. 4 is an illustration of an input choice being displayed at an input location in an application on an electronic display device and an input device.

As can be seen in FIG. 4, the input 410 is over the "f" key on the input device 162 (a keyboard). Logically, an "f" is displayed on the application in or near the selection indication 430. The input choice 450 may be displayed inside a highlight area 460 such that the attention of a user will be drawn to the input choice 450. In this way, a user can see if their finger is on the proper key without looking at the keyboard 162 but by only looking at the display 191.

FIG. 5 may illustrate another possible embodiment. In FIG. 5, a plurality of input choices 450 that are proximate 470 the input location 410 may be displayed as alternate inputs 460 on the electronic display device 191. By simply looking at the electronic display device 191, the user can see if the input choice 450 has been selected and if the proper input 450 has not been selected, the proximal inputs 470 are displayed such that a user can easily move the input 400 to the desired input choice 450 as the location of the proximal inputs 470 are known. In some embodiments, the input choices 450 may be highlighted 460, such as in a circle, on the electronic display 191 if the input 410 is substantially covering the input choice 400. If the input 400 covers more than one input location 400, the input choice 450 most covered by the input 410 may be highlighted.

Referring again to FIG. 2, at block 220, if an input choice 450 was selected, such as by pressing and releasing a key on a keyboard, the input choice 450 may be added to the input queue 455 on the electronic computing device 110. If the input choice 450 is selected, the input choice 450 may be displayed on the electronic display 191. Similarly, if a selected input choice 450 is not released, the input choice 450 may not be added to the input queue 455 on the electronic computing device 110. If the input 410 moves off the input location 400 all together, the selection indication 430 and the application input location 440 may no longer be displayed.

The method may be part of an application. In another embodiment, the method is a stand alone application that operates over an existing application requiring no recoding of the existing application. The method may be modified by a user as required, such as changing the repeat time, the selection indication, a size of the highlighted area, whether proximal input choices 400 are displayed, etc.

As a result, users may be able to edit text on a display while solely looking at the application on the display device 191. No longer will users have to waste time trying to view the position of fingers on an input device 162. The result is an improved user experience, less processor usage as users will no longer have to type and erase mistypes and less time spent on applications.

In conclusion, the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

The invention claimed is:

1. A method comprising:
   sensing an input location of an input to an input device;
   presenting for display on a display device communicatively coupled to the input device:
      a selection indication that visually identifies a location of an input queue on the display device; and
      input choices that are positionally related to the input location and that are presented proximal to the selection indication, the selection indication visually spanning a display space between the input choices and the input queue such that the input choices are visually linked to the input queue, the input queue indicating a location where at least one of the input choices, if selected, is displayable; and
   adding at least one of the input choices to the input queue on the display device in response to a selection of the at least one of the input choices.

2. The method of claim 1, further comprising enabling a user to adjust a repeat time associated with a repeat function for one or more of the input choices.

3. The method of claim 1, further comprising presenting for display one or more different input choices responsive to receiving an indication of a slide gesture from the input location to a different input location.

4. The method of claim 1, further comprising highlighting one of the input choices when the input is substantially covering the input location related to the one of the input choices.

5. The method of claim 1, further comprising increasing a repeat time, wherein the repeat time comprises an elapsed time prior to starting a repeat function for the at least one of the input choices.

6. The method of claim 5, further comprising enabling the repeat time to be adjusted.

7. The method of claim 1, further comprising displaying an illustration on the display device that the at least one of the input choices is being inserted at the input queue.

8. The method of claim 1, wherein the input contacts at least one other input location, and wherein said presenting comprises highlighting the at least one of the input choices based on the at least one of the input choices being related to the input location most covered by the input location.

9. The method of claim 1, wherein sensing the input location further comprises using a sensor proximate to an input device which receives the input to create an x location and a y location of the input.

10. The method of claim 1, wherein the input is received via touch input to the display device.

11. A computer storage device storing computer executable instructions for:
   sensing an input to an input device, the input at least partially overlapping an input location and at least one other input location;
   presenting for display on a display device:
      a selection indication that visually identifies a location of an input queue on the display device; and
      input choices related to the input location and the at least one other input location, the input choices being presented for display adjacent to the selection indication and the input queue, the input queue indicating a location where at least one of the input choices, if selected, is displayable, and the selection indication visually linking the input choices to the input queue and being visually separate from the input choices and the input queue;
   highlighting one of the input choices associated with the input location based on the input overlapping the input location to a greater degree than the input overlaps the at least one other input location; and
   responsive to the one of the input choices being selected and released, adding the one of the input choices to the input queue.

12. The computer storage device of claim 11, further comprising enabling a user to adjust a repeat time associated with a repeat function for one or more of the input choices.

13. The computer storage device of claim 11, further comprising computer executable instructions for presenting for display one or more different input choices responsive to receiving an indication of a slide gesture from the input location to a different input location.

14. The computer storage device of claim 11, further comprising computer executable instructions for increasing a repeat time comprising an elapsed time prior to starting a repeat function for the input choice that is selected.

15. The computer storage device of claim 11, further comprising computer executable instructions for displaying an illustration on the display device that indicates that the one of the input choices will be inserted at the input queue if the input to the input location is released.

16. The computer storage device of claim 11, wherein sensing the input comprises using a sensor proximate to the input device to create an x location and a y location of the input.

17. A computer system comprising a memory storing computer executable instructions and a processor configured to execute the computer executable instructions, the computer executable instructions being executable for:
   sensing an input location of an input to an input device;
   presenting for display on a display device:
      a selection indication that visually identifies a location of an input queue on the display device; and
      input choices that are related to the input location on the display device, the selection indication visually associating the input choices with the input queue by providing a visual linking indicium that spans a visual region between the input choices and the input queue; and
   responsive to a selection of one of the input choices, adding the one of the input choices to the input queue.

18. The computer system of claim 17, wherein the input location is associated with the one of the input choices, and wherein said presenting further comprises highlighting the one of the input choices based on the input overlapping the input location to a greater degree than the input overlaps another input location.

19. The computer system of claim 17, further comprising computer executable instructions for increasing a repeat time comprising an elapsed time prior to starting a repeat function for the one of the input choices.

20. The computer system of claim 17, further comprising computer executable instructions for displaying an illustration on the display device that indicates that the one of the input choices will be inserted at the input queue if the input to the input location is released.

* * * * *